No. 803,417. PATENTED OCT. 31, 1905.
T. H. HAYNOR.
FERTILIZER DISTRIBUTER.
APPLICATION FILED APR. 27, 1905.

Witnesses          Inventor
                   Thomas H. Haynor
by:
Evert C Palmer     Edson Bro's
                   Attys

UNITED STATES PATENT OFFICE.

THOMAS H. HAYNOR, OF NORFOLK, VIRGINIA.

FERTILIZER-DISTRIBUTER.

No. 803,417.      Specification of Letters Patent.      Patented Oct. 31, 1905.

Application filed April 27, 1905. Serial No. 257,740.

*To all whom it may concern:*

Be it known that I, THOMAS H. HAYNOR, a citizen of the United States, residing at Norfolk, in the county of Norfolk and State of Virginia, have invented certain new and useful Improvements in Fertilizer-Distributers; and I do hereby declare the following to be a full, clear, and exact description of the invention, such as will enable others skilled in the art to which it appertains to make and use the same.

My invention relates to improvements in fertilizer sowers or droppers.

Heretofore in distributing or sowing fertilizers, more particularly in connection with the planting or dropping the seed in hills, the fact has seemingly been overlooked or lost sight of that only so much thereof is effective or productive of results as contacts with the seed or roots, and as a consequence, as the fertilizer has been sown without due regard to said fact, much waste has resulted and immature growth has followed, with correspondingly indifferent crops. Appreciative of these facts or defects, it is the purpose of my invention to remedy or overcome the same; and to that end it consists of the employment of certain devices or contrivances substantially as hereinafter more fully disclosed, and particularly pointed out by the claims.

Figure 1:
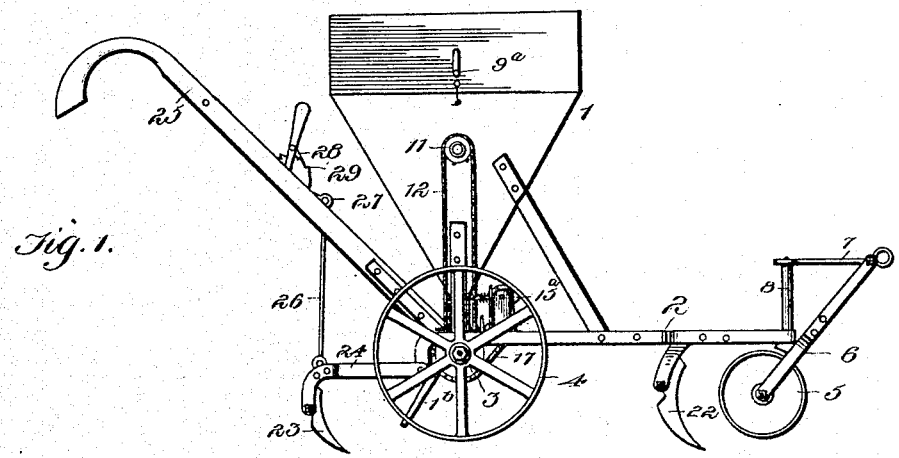
Figure 2:
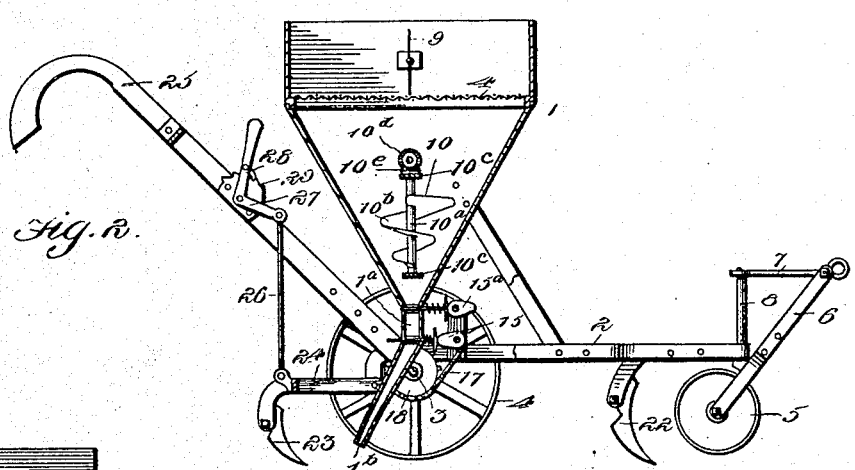
Figure 3:
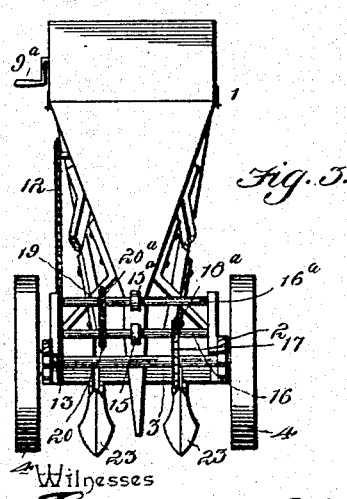
Figure 4:
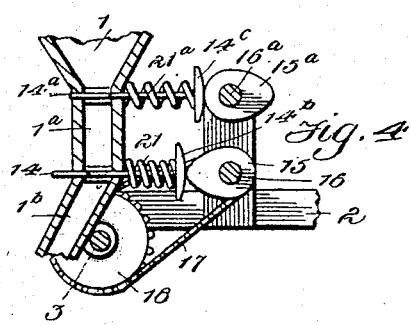

In the accompanying drawings, illustrating the preferred embodiment of my invention, Figure 1 is a side elevation. Fig. 2 is a sectional elevation. Fig. 3 is a rear elevation, and Fig. 4 is an enlarged detailed section showing more especially the fertilizer-regulator.

Latitude is allowed herein as to details, as they may be changed or varied at will without departing from the spirit of my invention and the same yet remain intact and be protected.

In carrying out my invention I provide a suitable receptacle or hopper 1, preferably formed with an upper angular portion from which it is tapered downward to aid the feeding or passage of its contents or the fertilizer. Said receptacle or hopper is suitably mounted upon a frame 2, secured at its rear end upon an axle 3, carried by wheels 4. The forward end of said frame is supported upon a caster-wheel 5, hung between the arms of the forked end of a standard 6, suitably connected to said frame and also at its upper end to the forward end of the draft-bar 7, whose rear is connected to the upper end of a post 8, red to the upper side of the frame 2 at its forward end. In the upper part of said hopper is a horizontal subdividing-screen 4, secured to its sides, and within the compartment above said screen is journaled or hung in the sides of said hopper an agitator or stirrer 9, having a suitable actuating-handle $9^a$ to loosen up the fertilizer and effect its passage through said screen to the compartment below. Also in the lower compartment of said hopper is a second stirrer or agitator 10, comprising a vertical shaft or stem $10^a$, having a tapering spiral or augur-like blade $10^b$ traversing it, with the taper at the lower end thereof, thus providing as the stirrer is actuated for the feeding of the contents of the hopper downward toward the bottom of the hopper, as required for its delivery. The shaft or stem $10^a$ is suitably stepped or journaled at its ends in cross-pieces $10^c$, secured to the sides of the hopper. It is driven, preferably, by intergeared pinions $10^d$ $10^e$, one secured to its upper end and the other upon a short shaft supported in the side of the hopper and having secured to its outer end a sprocket-pinion 11, engaged by a chain-belt 12 also engaging a corresponding pinion 13, secured upon the axle 3 of the machine.

The lower discharging end of the hopper 1 has a downward extension or chamber $1^a$ to receive the fertilizer from said hopper and adapted to gage the sowing or dropping of the fertilizer, as will be hereinafter apparent. To the lower end of said chamber $1^a$ is connected a tube or chute $1^b$, preferably inclined or deflected rearward and downward, tapering somewhat toward its lower or discharging end, which practically enters the loosened soil to deliver the fertilizer received thereinto, as presently explained, so as to directly reach or contact with the seed previously deposited or planted—as, for instance, in hills.

Two alternately-actuated valves or slides 14 $14^a$ are arranged, one to slide in or open and close the upper end of the chamber $1^a$ and the other to slide in or open and close the lower end of said chamber. The stems of said valves or slides have their distant ends provided with preferably convex-faced enlargements or buffers $14^b$ $14^c$, adapted to be engaged by cams or eccentrics 15 $15^a$, respectively carried by shafts 16 $16^a$. Said shafts are suitably journaled in suitable supports or bearings, secured upon the machine-frame 2, and are driven, preferably, by a chain-belt 17, engaging sprocket wheels or pinions 18 $18^a$, secured to the shafts 3 16, respectively, and a like belt 19, compassing similar wheels or pinions 20 20ª, secured upon the shafts 16 16ª, as shown. It will be observed that the maximum radii of the cams or eccentrics 15 15ª are alternately presented toward the buffers 14ᵇ 14ᶜ of the valves or slides 14 14ª, and therefore provide for alternately actuating said valves or slides. Accordingly the upper valve is opened to permit the passage or entrance of a quantity of the fertilizer from the hopper into the chamber 1ª, and when said chamber has received the fertilizer said valve is closed, and immediately thereafter the lower valve is opened, allowing the dropping of the fertilizer into the tube or chute 1ᵇ, whence, as above noted, it is delivered at such intervals as will correspond to the distance or interval apart between the hills into which the seed has previously been deposited. To effect the automatic return movement or closing of the valves 14 14ª, springs 21 21ª are applied to their stems between the casing of the chamber 1ª and the buffers 14ᵇ 14ᶜ. The action of the cams or eccentrics 15 15ª, effecting the opening of said valves, simultaneously compresses or increases the tension of said springs. Consequently upon the withdrawal of the maximum radii of said cams or eccentrics from the buffers of the valve-stems the reflex or expansive action of said springs will have the above-stated effect upon said valves.

Suitable furrow opening and covering plows or shovels 22 23 are suitably hung from the frame 2 and from hinged or pivoted beams 24, connected to said frame, respectively. The rear covering plows or shovels 23 have their beams 24 suitably suspended from the guiding-handles 25 at the rear end of the machine by rods 26, suitably connected to said beams near their rear ends and to preferably bell-crank or angled levers 27, pivoted to said handles. Said levers, which are adapted to be conveniently actuated by hand in suitably manipulating the plow or shovel beams, are provided with pawls 28, engaging ratchets 29, secured to said handles for the proper retention of said levers in position when released from the hand of the operator.

Having thus fully described my invention, what I claim, and desire to secure by Letters Patent, is—

1. A fertilizer-distributer, having its hopper provided with a subdividing-screen, an agitator or stirrer arranged above said screen and a second stirrer arranged below said screen, and means for actuating said stirrers, substantially as set forth.

2. A fertilizer-distributer, having at the lower end of its hopper a chamber, valves arranged at the upper and lower ends of said chamber, with their stems projecting therefrom, cams adapted to alternately actuate said valves, and means to hold said stems in contact with said cams.

3. In a fertilizer-distributer, a hopper, a chamber arranged at the lower end of said hopper, valves arranged at the upper and lower ends of said chamber with their stems projecting therefrom, cams adapted to alternately actuate said valves, and springs mounted around said stems for the purpose specified.

4. In a fertilizer-distributer, a hopper, a chamber arranged at the lower end of said hopper, valves arranged at the upper and lower ends of said chamber with their stems projecting therefrom, cams mounted on separate shafts adapted to alternately actuate said valves, pinion and belt connections between said shaft and wheel-axle, and means to hold said stems in contact with said cams.

5. A fertilizer-distributer, having a chamber at its lower end, valves arranged at the upper and lower ends of said chamber, and having buffers upon the projecting ends of their stems, and suitably-actuated cams or eccentrics adapted to alternately engage said buffers, substantially as set forth.

6. A fertilizer-distributer having a chamber at its lower end, valves arranged at the upper and lower ends of said chamber and having stems provided with buffers or enlargements at their distant ends, springs applied to said stems, cams having their maximum radii presented alternately toward said buffers, and means for actuating said cams, substantially as set forth.

In testimony whereof I affix my signature in presence of two witnesses.

THOMAS H. HAYNOR.

Witnesses:
ELIZABETH GRACE WEAVER,
ALBERT SPARKS.